United States Patent
Uetani

(10) Patent No.: US 10,911,746 B2
(45) Date of Patent: Feb. 2, 2021

(54) IMAGE PROCESSING APPARATUS AND FAILURE DIAGNOSIS CONTROL METHOD

(71) Applicants: Kabushiki Kaisha Toshiba, Minato-ku (JP); Toshiba Electronic Devices & Storage Corporation, Minato-ku (JP)

(72) Inventor: Yoshiharu Uetani, Kawasaki (JP)

(73) Assignees: Kabushiki Kaisha Toshiba, Minato-ku (JP); Toshiba Electronic Devices & Storage Corporation, Minato-ku (JP)

(*) Notice: Subject to any disclaimer, the term of this patent is extended or adjusted under 35 U.S.C. 154(b) by 0 days.

(21) Appl. No.: 15/931,098

(22) Filed: May 13, 2020

(65) Prior Publication Data

US 2020/0275090 A1 Aug. 27, 2020

Related U.S. Application Data

(62) Division of application No. 15/901,515, filed on Feb. 21, 2018, now Pat. No. 10,694,176.

(30) Foreign Application Priority Data

Sep. 11, 2017 (JP) ................. 2017-174039

(51) Int. Cl.
  *H04N 17/00* (2006.01)
  *H04N 5/376* (2011.01)
  *H04N 5/369* (2011.01)
(52) U.S. Cl.
  CPC ......... *H04N 17/002* (2013.01); *H04N 5/3765* (2013.01); *H04N 5/3698* (2013.01)

(58) Field of Classification Search
  CPC .................................................... H04N 17/002
  See application file for complete search history.

(56) References Cited

U.S. PATENT DOCUMENTS

| | | | |
|---|---|---|---|
| 5,778,008 A | 7/1998 | Shimizu et al. | |
| 2007/0043971 A1* | 2/2007 | Suzuki | H04N 1/00037 714/11 |
| 2007/0230779 A1* | 10/2007 | Sato | H04N 5/367 382/167 |
| 2009/0281839 A1* | 11/2009 | Lynn | G06Q 50/22 705/3 |
| 2010/0058134 A1* | 3/2010 | Matsui | A61B 6/00 714/748 |
| 2015/0165974 A1 | 6/2015 | Yokota et al. | |
| 2016/0117831 A1 | 4/2016 | Nakashima et al. | |
| 2016/0274185 A1* | 9/2016 | Nishikawa | G01R 31/31853 |

(Continued)

FOREIGN PATENT DOCUMENTS

| | | |
|---|---|---|
| EP | 2 879 381 A1 | 6/2015 |
| EP | 3 249 902 A1 | 11/2017 |

(Continued)

*Primary Examiner* — Joseph D Torres
(74) *Attorney, Agent, or Firm* — Oblon, McClelland, Maier & Neustadt, L.L.P.

(57) ABSTRACT

Certain embodiments provide an image processing apparatus including an image processing circuit configured to perform image processing on continuously captured image data frame by frame, a failure diagnosis processing circuit configured to diagnose a failure of the image processing circuit, and a failure diagnosis control circuit configured to control whether to perform failure diagnosis at an arbitrary frame.

6 Claims, 11 Drawing Sheets

(56) References Cited

U.S. PATENT DOCUMENTS

2017/0020470 A1* 1/2017 Tezuka .................. A61B 6/542
2017/0345306 A1* 11/2017 Mutou .................. H04N 5/345
2018/0075597 A1* 3/2018 Zhou ...................... A61B 6/037

FOREIGN PATENT DOCUMENTS

| JP | 9-6943 | 1/1997 |
|----|--------|--------|
| JP | 2008-160223 | 7/2008 |
| JP | 4752755 | 8/2011 |
| JP | 2014-230237 | 12/2014 |
| JP | 2016-85721 | 5/2016 |
| JP | 6160242 | 7/2017 |
| WO | WO 2016/117401 A1 | 7/2016 |

* cited by examiner

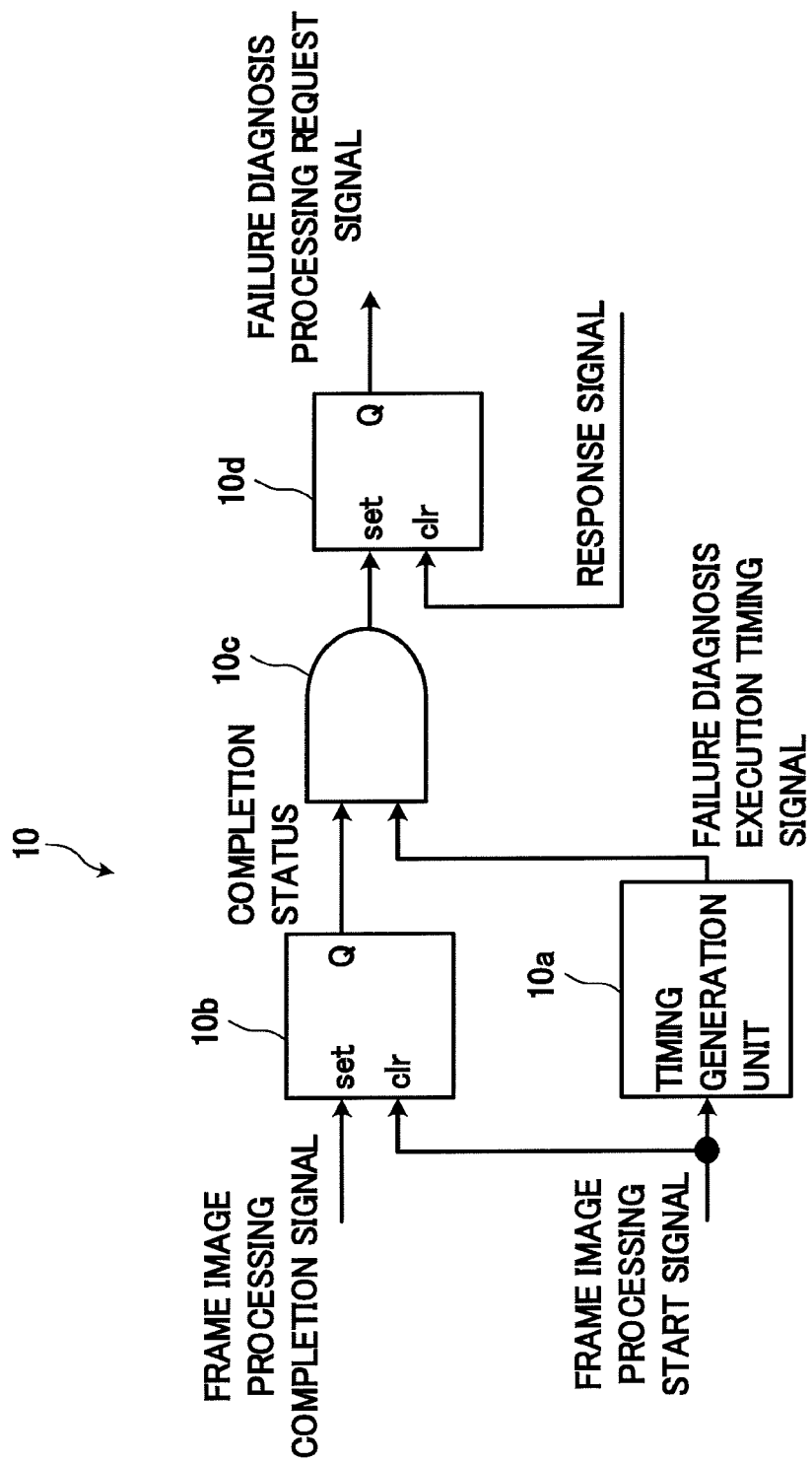

IMAGE PROCESSING APPARATUS AND FAILURE DIAGNOSIS CONTROL METHOD

CROSS REFERENCE TO RELATED APPLICATIONS

This application is a divisional of U.S. patent application Ser. No. 15/901,515, filed on Feb. 21, 2018, which is based upon and claims the benefit of priority from the prior Japanese Patent Application No. 2017-174039 filed in Japan on Sep. 11, 2017; the entire contents of which are incorporated herein by reference.

FIELD

Embodiments described herein relate generally to an image processing apparatus and a failure diagnosis control method.

BACKGROUND

There is a conventional image processing apparatus that can perform image processing on a captured image frame by frame and diagnose a failure of an image processing circuit frame by frame. The image processing apparatus performs the failure diagnosis during an idle time for the image processing by the image processing circuit after completion of the image processing for an arbitrary frame before starting image processing for a subsequent frame. The failure diagnosis of the image processing circuit includes transmitting a scan test pattern to the image processing circuit and comparing the scan test result obtained from the image processing circuit with an expected value.

The time required for image processing on image data of one frame is variable depending on congestion of a system bus. For example, when abnormal interrupt processing or the like arises, the timing when the image processing completes may be greatly delayed due to the congestion of the system bus. When the completion timing of the image processing is delayed, the failure diagnosis cannot be completed before the timing to start the image processing for the subsequent frame, and will be stopped. If the scan test is discarded when the failure diagnosis is not able to be completed, the failure diagnosis is useless and becomes a cause of power waste. As an alternative way, when the failure diagnosis processing is interrupted in the image processing of subsequent frame, it may be possible to continue the failure diagnosis processing after the image processing of the subsequent frame. However, in such a case, an appropriate circuit will be additionally required to save the uncompleted scan test result of each register of the image processing circuit. In addition, another circuit will be required to return the uncompleted scan test result to each register of the image processing circuit before continuing the failure diagnosis processing. As a result, a problem that the circuit scale becomes larger arises.

BRIEF DESCRIPTION OF THE DRAWINGS

FIG. 2 illustrates an exemplary configuration of a failure diagnosis control circuit according to the first embodiment.

DETAILED DESCRIPTION

Certain embodiments provide an image processing apparatus including an image processing circuit configured to perform image processing on continuously captured image data frame by frame, a failure diagnosis processing circuit configured to diagnose a failure of the image processing circuit frame by frame, and a failure diagnosis control circuit configured to control whether to perform the failure diagnosis for an arbitrary frame.

Hereinafter, image processing apparatuses according to preferred embodiments will be described in detail below with reference to attached drawings.

First Embodiment

An image processing apparatus according to the first embodiment is, for example, an in-vehicle camera or another apparatus configured to perform image processing, such as luminance correction, on continuously captured image data frame by frame, and has a function of diagnosing a failure of an image processing circuit frame by frame. The purpose of diagnosing the failure of the image processing circuit frame by frame is to confirm the reliability of image data subjected to image processing and to prevent erroneous image information from being used in a drive assist control.

Figure 1:
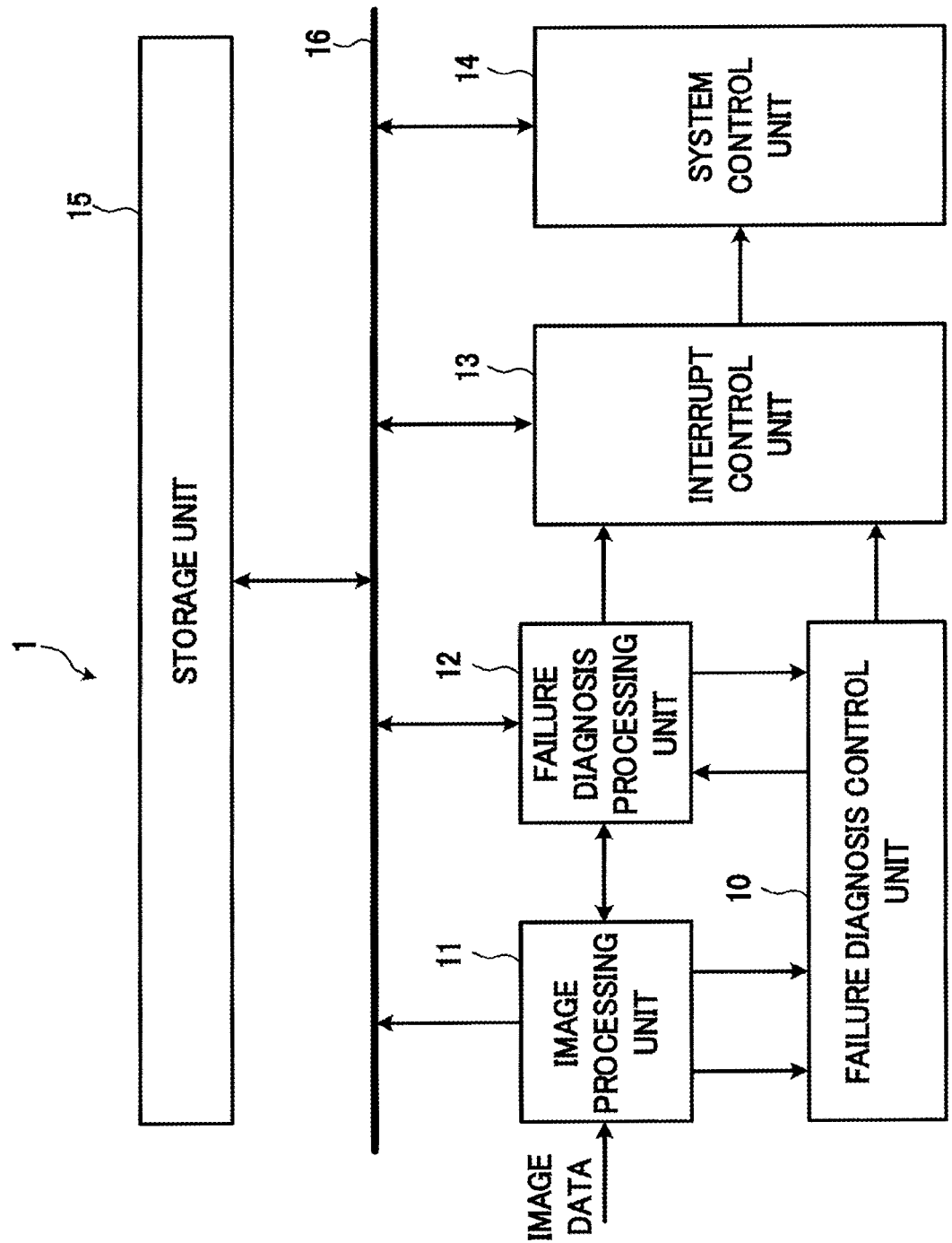
FIG. 1 illustrates an exemplary configuration of an image processing apparatus according to a first embodiment.

An image processing apparatus 1, as illustrated in FIG. 1, includes a failure diagnosis control circuit 10, an image processing circuit 11, a failure diagnosis processing circuit 12, an interrupt control circuit 13, a system control circuit 14, and a storage circuit 15. The image processing circuit 11, the failure diagnosis processing circuit 12, the interrupt control circuit 13, the system control circuit 14, and the storage circuit 15 are connected with each other via a system bus 16.

The storage circuit 15 includes a random access memory (RAM), a read only memory (ROM), and a semiconductor memory and the like. The storage circuit 15 stores image data processed by the image processing circuit 11, scan test data to be used by the failure diagnosis processing circuit 12, and an expected value thereof.

The image processing circuit 11 includes a digital signal processing circuit (DSP) and the like. The image processing circuit 11, for example, performs image processing according to parameters having been set by the system control circuit 14. The image processing circuit 11 receives image data frame by frame from an imaging apparatus (not illustrated) and performs image processing. Although the contents of the image processing are not limited, the image processing circuit 11 may perform image processing, such as, color space conversion processing for conversion from RGB to YUV, luminance correction processing suitable for image recognition including amplifying or attenuating the luminance, edge emphasis processing, and zooming processing for changing the size of an object. The image processing circuit 11 stores the image data subjected to the image processing, via the system bus 16, in the storage circuit 15.

Further, the image processing circuit 11, at the timing to start image processing for one frame, sends a frame image processing start signal (image processing start information) to the failure diagnosis control circuit 10. Further, the image processing circuit 11, upon completion of the image processing for one frame, sends a frame image processing completion signal to the failure diagnosis control circuit 10.

The failure diagnosis processing circuit 12 includes a DSP and the like. The failure diagnosis processing circuit 12, under the control of the failure diagnosis control circuit 10, performs processing for diagnosing a failure of the image processing circuit 11 frame by frame in a dormant period during which the image processing circuit 11 is not performing the image processing. More specifically, the failure diagnosis processing circuit 12 sends scan test data to the image processing circuit 11, and acquires a scan test result from the image processing circuit 11. The value of the scan test result is already known when the scan test data has been normally subjected to image processing circuit 11. The failure diagnosis processing circuit 12 or the storage circuit 15 has beforehand an expected value corresponding to the scan test data. The failure diagnosis processing circuit 12 compares the scan test result of the image processing circuit 11 with the expected value. The failure diagnosis processing circuit 12 determines that the image processing circuit 11 is operating normally if the scan test result coincides with the expected value. And the failure diagnosis processing circuit 12 determines that the image processing circuit 11 has failure if they do not coincide with each other.

The failure diagnosis processing circuit 12 performs the failure diagnosis processing only when a failure diagnosis processing request signal is received from the failure diagnosis control circuit 10. The failure diagnosis processing circuit 12, in response to the diagnosis processing request signal received from the failure diagnosis control circuit 10, returns a response signal to the failure diagnosis control circuit 10. In addition, the failure diagnosis processing circuit 12 sends a failure detection signal to the interrupt control circuit when the diagnosis result indicates that the image processing circuit 11 has failure.

The interrupt control circuit 13 sets respective cause registers based on a later-described image processing start signal and a failure diagnosis start signal for a related frame received from the failure diagnosis control circuit 10 and the failure detection signal received from the failure diagnosis processing circuit 12. The interrupt control circuit 13 notifies the system control circuit 14 of the setting of the cause registers by assertion of an interrupt signal. When the system control circuit 14 confirms these causes via the system bus 16 and clears the cause registers, the interrupt signal is deasserted. The interrupt control circuit 13 can be configured to include an OR logic circuit to which outputs from a plurality of cause registers are supplied.

The system control circuit 14 includes a central processing circuit (CPU) and the like, and controls various operations to be performed by the image processing apparatus 1. The system control circuit 14, for example, when the interrupt control circuit 13 has confirmed the cause of a failure interrupt, or when the failure diagnosis start signal has not been confirmed before starting image processing for a subsequent frame, controls each apparatus in a vehicle in such a way as to prevent image data of a related frame from being used in recognition processing and the like. Further, the system control circuit 14 may control each apparatus in the vehicle in such a way as to perform a display operation to inform the occurrence of a failure in the image processing circuit 11 or unsuccessful execution of the failure diagnosis. Further, the system control circuit 14 may have a function of analyzing the cause of a failure with reference to information obtainable from various sensors in the apparatus. Then, the system control circuit 14 may cause a display circuit (not illustrated) to display the cause of the failure.

The failure diagnosis control circuit 10 controls whether to perform failure diagnosis after completing image processing for an arbitrary frame. More specifically, the failure diagnosis control circuit 10 determines whether the failure diagnosis processing to be performed after the image processing for an arbitrary frame can be completed before starting image processing for a subsequent frame. Then, the failure diagnosis control circuit 10, if it is determined that the failure diagnosis processing cannot be completed, controls the failure diagnosis processing circuit 12 not to perform the failure diagnosis processing after completing the image processing for the arbitrary frame. In detail, if image processing completion information about an arbitrary frame is not received from image processing circuit 11 until a pre-set time elapses since the start of the image processing for the arbitrary frame, the failure diagnosis control circuit 10 controls the failure diagnosis processing circuit 12 not to perform the failure diagnosis processing after completing the image processing for the arbitrary frame.

FIG. 2 illustrates an exemplary configuration of the failure diagnosis control circuit 10. As illustrated in FIG. 2, the failure diagnosis control circuit 10 includes a timing generation circuit 10a, a set/reset type flip-flop 10b, an AND circuit 10c, and a set/reset type flip-flop 10d. The timing generation circuit 10a can be configured to include a shift register, a counter, or a timer element and the like.

Figure 3A:
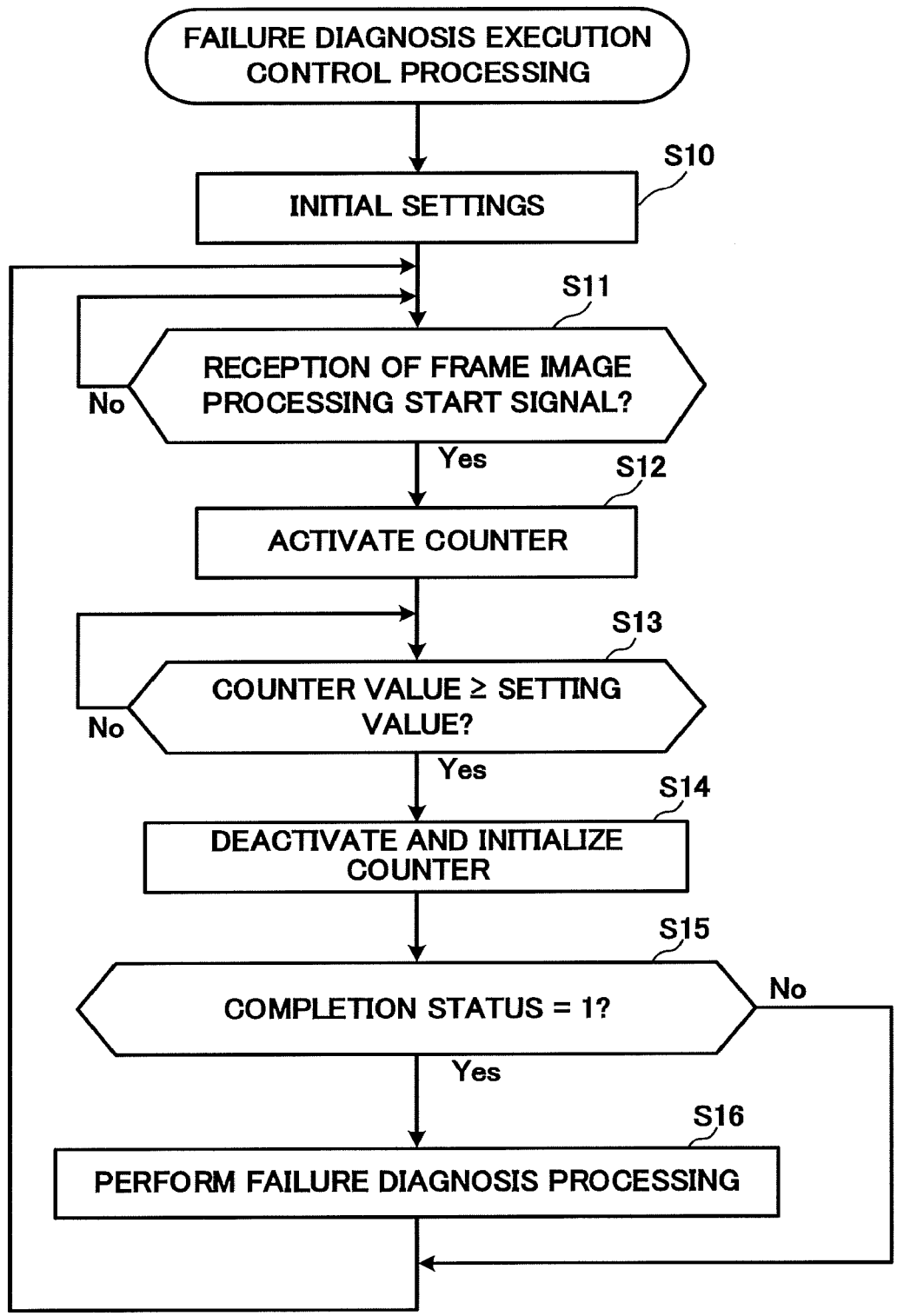
FIG. 3A is a flowchart illustrating a failure diagnosis control circuit according to the first embodiment.
Figure 3B:
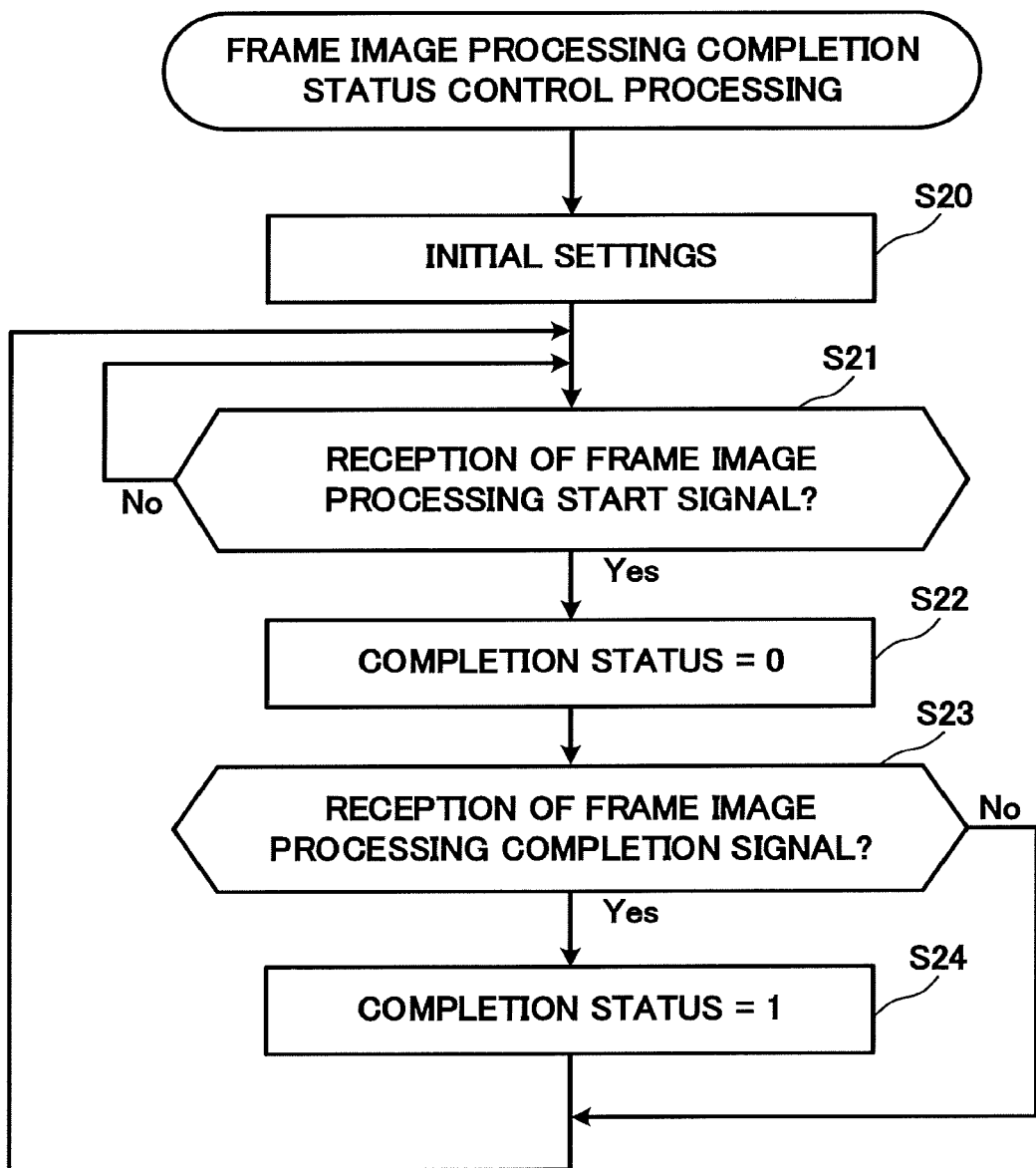
FIG. 3B is a flowchart illustrating the failure diagnosis control circuit according to the first embodiment.
Figure 4:
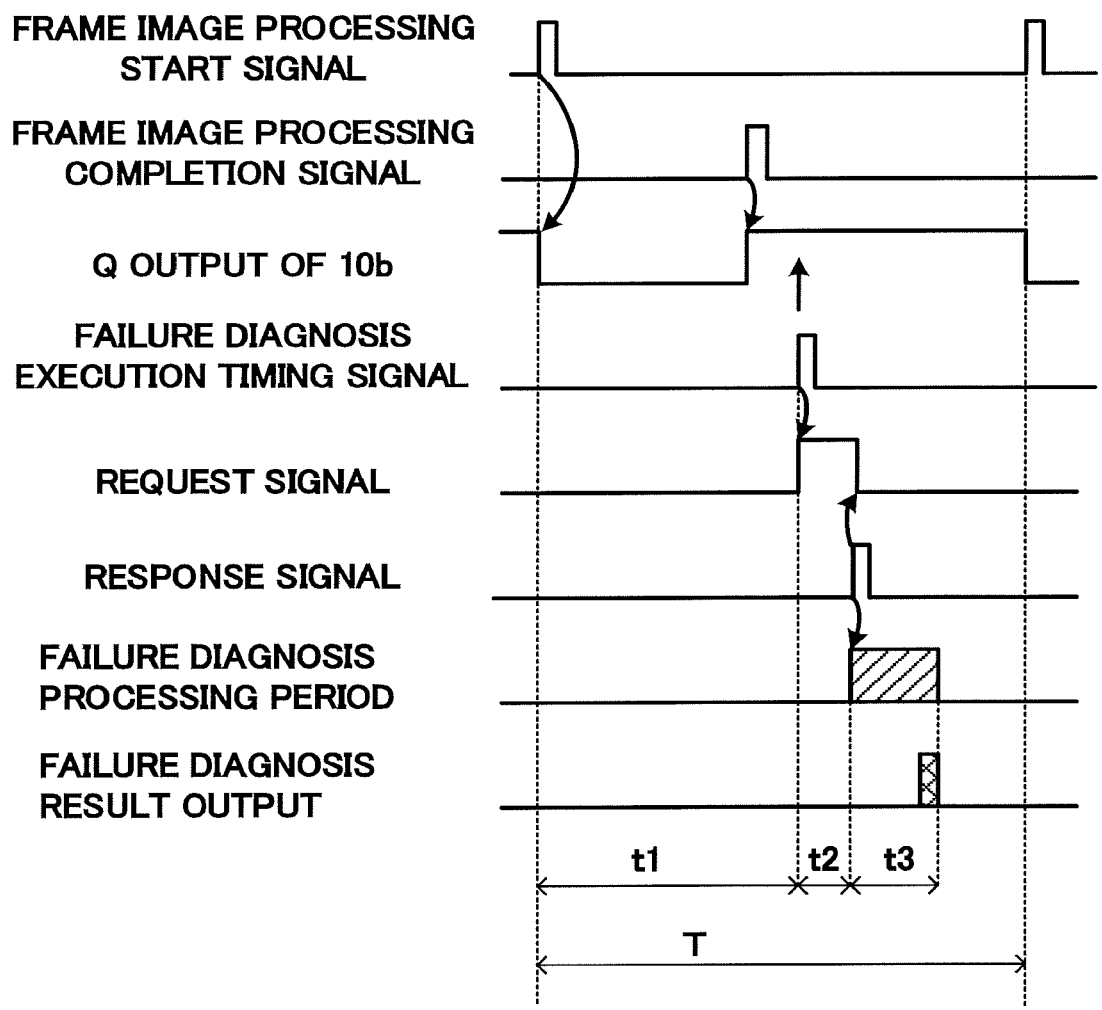
FIG. 4 illustrates the failure diagnosis control circuit according to the first embodiment.
Figure 5:
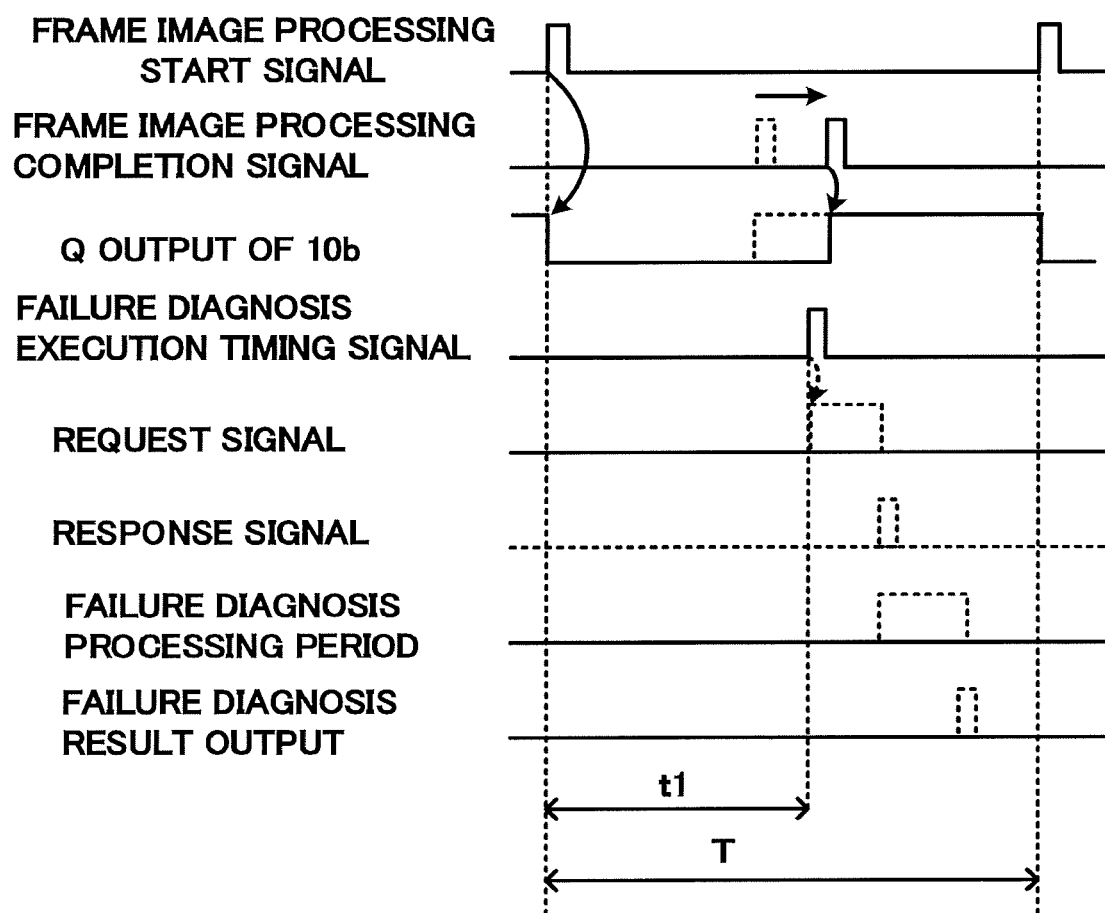
FIG. 5 illustrates various signals and operational states of the failure diagnosis control circuit according to the first embodiment.

Next, operations of the failure diagnosis control circuit 10 will be described with reference to FIGS. 3 to 5. FIGS. 3A and 3B are flowcharts illustrating the failure diagnosis control circuit according to the first embodiment. FIG. 3A is a flowchart illustrating failure diagnosis execution control processing. FIG. 3B is a flowchart illustrating frame image processing completion status control processing. The failure diagnosis execution control processing illustrated in FIG. 3A and the frame image processing completion status control processing illustrated in FIG. 3B can be performed in parallel. FIG. 4 is a time chart illustrating the failure diagnosis processing. FIG. 5 is a time chart illustrating a case where the failure diagnosis processing is not performed.

In the failure diagnosis execution control processing, upon completing initial settings for the image processing apparatus 1 (step S10), the imaging apparatus (not illustrated) sequentially input image data to the image processing circuit 11 at intervals of time T. For example, when the image capturing speed of the imaging apparatus is 30 frames per second, the image processing circuit 11 acquires image data of one frame at intervals of approximately 33 msec. The image processing circuit 11 sends the frame image processing start signal to the failure diagnosis control circuit 10 at the timing to start image processing for one frame. If the failure diagnosis control circuit 10 confirms reception of the frame image processing start signal (Yes in step S11), the failure diagnosis control circuit 10 activates the counter of the timing generation circuit 10a illustrated in FIG. 2 (step S12).

In parallel with the above-mentioned processing, in the frame image processing completion status control processing, initial settings (step S20) and acquisition and monitoring of the frame image processing start signal (step S21) are performed. Step S11 and step S21 are common processing. If the frame image processing start signal is acquired (Yes in step S21), the failure diagnosis control circuit 10 sets a Q output (completion status) of the flip-flop 10b to low-level as illustrated in FIG. 4 (step S22).

In the failure diagnosis execution control processing, the timing generation circuit 10a illustrated in FIG. 2, upon receiving the frame image processing start signal, activates the counter of the timing generation circuit 10a (step S12). Then, the timing generation circuit 10a compares a counter value with a setting value having been set beforehand and continues the counting operation until a predetermined time t1 elapses (step S13). The timing generation circuit 10a, upon elapse of the predetermined time t1 (Yes in step S13), deactivates and initializes the counter and generates a failure diagnosis execution timing signal (step S14). The predetermined time t1 is set beforehand as a time obtainable by subtracting a value equal to or longer than the time required for the failure diagnosis processing from the time of a frame image processing start period. More specifically, as illustrated in FIG. 4, the predetermined time t1 is determined to be equal or less than a value obtainable by subtracting response time t2 required for the failure diagnosis processing circuit 12 to return a response signal and time t3 required for the failure diagnosis processing from time T of the frame image processing start period.

In parallel with the above-mentioned processing, in the frame image processing completion status control processing, the image processing circuit 11, upon completion of the image processing for one frame, sends the frame image processing completion signal to the failure diagnosis control circuit 10. The failure diagnosis control circuit 10, if the frame image processing completion signal is received (Yes in step S23), sets the Q output (completion status) of the flip-flop 10b to high-level, as illustrated in FIG. 4 (step S24). The image processing circuit 11, upon completing the storage of all the image data subjected to the image processing into the storage circuit 15 via the system bus 16, outputs the frame image processing completion signal. Accordingly, in a case where the system bus 16 is congested due to some reason, the timing to output the frame image processing completion signal may be delayed. The duration in which the Q output of the flip-flop 10b remains at low-level is equal to the duration in which the image processing circuit 11 is performing the image processing for one frame.

Subsequently, the failure diagnosis control circuit 10, as part of the failure diagnosis execution control processing, determines whether the frame image processing completion signal has been received prior to the generation of the failure diagnosis execution timing signal by the timing generation circuit 10a (step S15). If the frame image processing completion signal has been received prior to the generation of the failure diagnosis execution timing signal by the timing generation circuit 10a (Yes in step S15), the Q output (completion status) of the flip-flop 10b turns into high-level before the failure diagnosis execution timing signal output from the timing generation circuit 10a illustrated in FIG. 2 turns into high-level, as illustrated in FIG. 4. Accordingly, as output of the AND circuit 10c, a signal having the same waveform as the failure diagnosis execution timing signal is output. Using this signal as a trigger, the flip-flop 10d outputs the failure diagnosis processing request signal.

The failure diagnosis processing circuit 12, upon receiving the failure diagnosis processing request signal, returns a response signal to the failure diagnosis control circuit 10. The response signal resets the flip-flop 10d. The duration in which the failure diagnosis processing request signal (i.e., the Q output of the flip-flop 10d) remains at high-level is the response time t2 of the failure diagnosis processing circuit 12.

In response to the failure diagnosis processing request signal, the failure diagnosis processing circuit 12 diagnoses a failure of the image processing circuit 11 (step S16). More specifically, the failure diagnosis processing circuit 12 transmits scan test data to the image processing circuit 11. The image processing circuit 11 performs a scan test with the received scan test data. The failure diagnosis processing circuit 12 receives a scan test result from the image processing circuit 11. Then, the failure diagnosis processing circuit 12 compares the scan test result with the expected value. The failure diagnosis processing circuit 12, if the scan test result coincides with the expected value, determines that the image processing circuit 11 has no failure. Further, the failure diagnosis processing circuit 12, if the scan test result does not coincide with the expected value, determines that the image processing circuit 11 has failure, and sends the failure detection signal to the interrupt control circuit 13.

On the other hand, if the frame image processing completion signal is received after the generation of the failure diagnosis execution timing signal by the timing generation circuit 10a (No in step S15), the Q output of the flip-flop 10b remains at low-level when the failure diagnosis execution timing signal output by the timing generation circuit 10a turns into high-level, as illustrated in FIG. Therefore, the signal of the Q output of the AND circuit 10c remains at low-level. Because of the absence of a trigger by the signal from the Q output of the AND circuit 10c, no failure diagnosis processing request signal is output from the flip-flop 10d. Accordingly, the failure diagnosis processing circuit 12 does not perform the failure diagnosis processing (No in step S15).

In the failure diagnosis execution control processing, after terminating the processing in step S15 (branched to No) or step S16, the failure diagnosis control circuit 10 repeats for a subsequent frame the processing in step S11 to step S15 (branched to No) or step S16. Further, in the frame image processing completion status control processing, after terminating the processing in step S23 (branched to No) or step S24, the failure diagnosis control circuit 10 repeats for the subsequent frame the processing in step S21 to step S23 (branched to No) or step S24.

Figure 6:
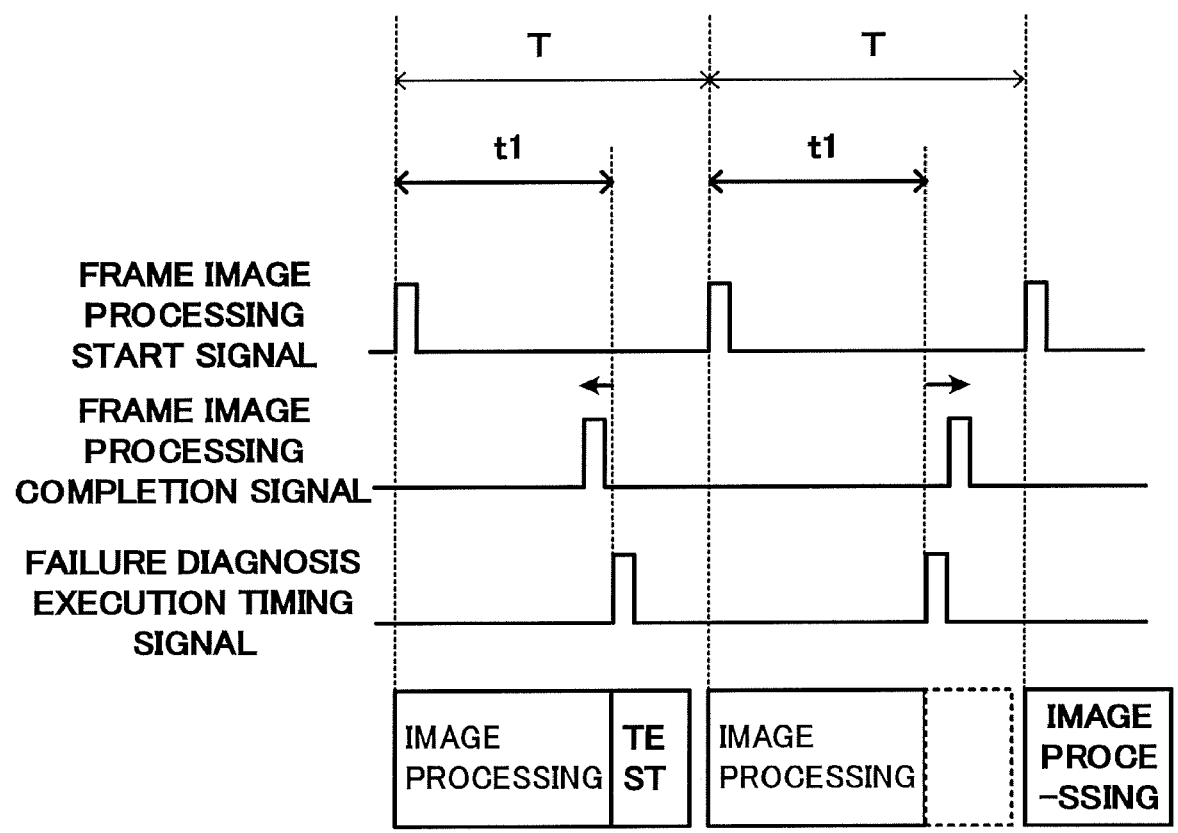
FIG. 6 illustrates the failure diagnosis control circuit according to the first embodiment.

As mentioned above, as illustrated in FIG. 6, if the frame image processing completion signal is received from the image processing circuit 11 before the predetermined time t1 elapses since reception of the frame image processing start signal for an arbitrary frame from the image processing circuit 11, the failure diagnosis control circuit 10 controls the failure diagnosis processing circuit 12 in such a way as to perform failure diagnosis after completing image processing for the corresponding frame. Further, if the frame image processing completion signal is not received from the image processing circuit 11 before the predetermined time t1 elapses since reception of the frame image processing start signal for an arbitrary frame from the image processing circuit 11, the failure diagnosis control circuit 10 controls the failure diagnosis processing circuit 12 in such a way as not to perform failure diagnosis after completing image processing for the corresponding frame, thereby preventing interruption of the failure diagnosis caused by lack of processing time. In addition, as the failure diagnosis result obtained during the processing is never discarded, it is feasible to prevent any useless processing and contribute to saving of electric power consumption.

Further, as the failure diagnosis control circuit 10 can be configured to be able to avoid halfway discard during the failure diagnosis with a small-scale circuit configuration illustrated in FIG. 2, it is feasible to downsize the apparatus and realize electric power saving.

Modified Example 1

In the above description, the circuit illustrated in FIG. 2 merely shows one possible configuration of the failure diagnosis control circuit 10. The failure diagnosis control circuit 10 is not limited to the above configuration. For example, a circuit configuration illustrated in FIG. 7 can be employed to realize similar functions. FIG. 8 illustrates an exemplary operation of the failure diagnosis control circuit 10 according to the modified example 1. As illustrated in FIG. 8, the Q output of the flip-flop 10b turns into low-level at the timing when the frame image processing start signal turns into high-level. Further, the Q output of the flip-flop 10b turns into high-level at the timing when the frame image processing completion signal turns into high-level.

When the Q output of the flip-flop 10b remains at high-level when the failure diagnosis execution timing signal is output from the timing generation circuit 10a, a high-level signal is generated from a Q output of a flip-flop 10f. Further, when the Q output of the flip-flop 10b remains at low-level when the failure diagnosis execution timing signal is output from the timing generation circuit 10a, a low-level signal is generated from the Q output of the flip-flop 10f. More specifically, in a case where the image processing by the image processing circuit 11 is greatly delayed more than a predetermined time, the Q output of the flip-flop 10b remains at low-level at the timing to output the failure diagnosis execution timing signal and therefore the low-level signal is generated from the Q output of the flip-flop 10f. When the Q output of the flip-flop 10f remains at low-level, the failure diagnosis processing request signal is not output because the flip-flop 10d is not set, and accordingly the failure diagnosis processing is not executed. In order to perform the above-mentioned processing frame by frame, the flip-flop 10f resets beforehand the frame image processing start signal.

Modified Example 2

As described above, the first embodiment and the modified example 1 employ a logic circuit to realize the failure diagnosis control circuit 10. Alternatively, software processing may be employed to realize the functions of the failure diagnosis control circuit 10. For example, it can be realized by monitoring, with the software, the order of reception between the frame image processing completion signal output from the image processing circuit 11 and the failure diagnosis execution timing signal output from the timing generation circuit 10a, illustrated in FIG. 6. More specifically, a monitoring flag for monitoring the state of image processing can be provided. The frame image processing start signal sets the monitoring flag to 1, and the frame image processing completion signal resets the monitoring flag to 0. The CPU can be configured to read the monitoring flag at the reception timing of the failure diagnosis execution timing signal, and can be configured to perform the failure diagnosis processing if the monitoring flag is 0 and skip the failure diagnosis processing if the monitoring flag is 1. Using the software processing as mentioned above can realize functions similar to those realized by the hardware.

Second Embodiment

The example of the failure diagnosis control processing described with reference to FIGS. 3A and 3B in the first embodiment is characterized by processing, in parallel, the failure diagnosis execution control processing and the frame image processing completion status control processing. In the second embodiment, an example of the failure diagnosis control processing characterized by performing, in series, the failure diagnosis execution control processing and the frame image processing completion status control processing will be described with reference to FIG. 9.

Figure 9:
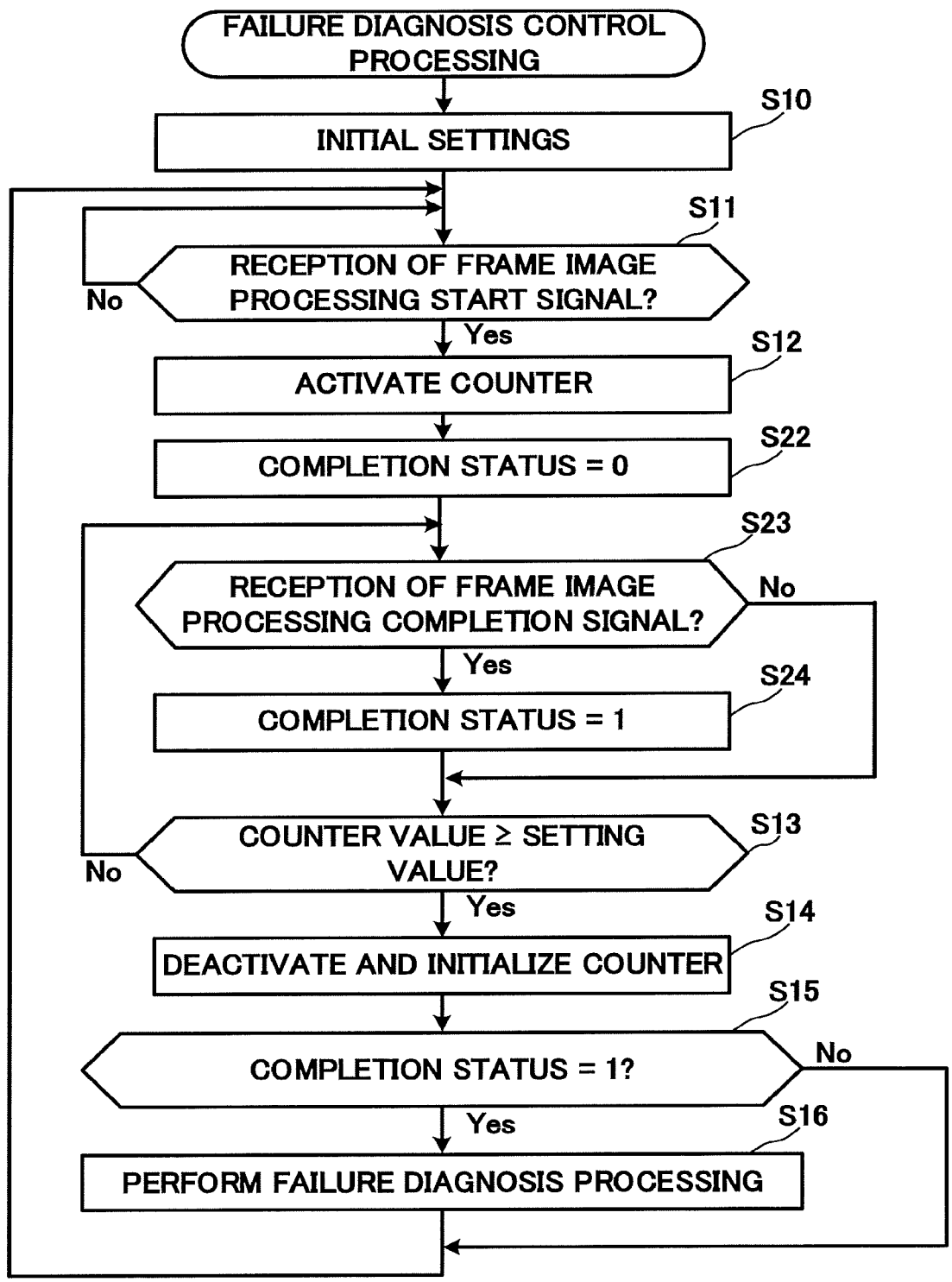
FIG. 9 is a flowchart illustrating a failure diagnosis control circuit according to a second embodiment.

In the example of the failure diagnosis control processing illustrated in FIG. 9, if the failure diagnosis control circuit 10 receives the frame image processing start signal from the image processing circuit 11 (Yes in step S11), the failure diagnosis control circuit 10 activates the counter in the failure diagnosis control circuit 10 (step S12) and clears the completion status in the failure diagnosis control circuit 10 (step S22). If the frame image processing completion signal is received from the image processing circuit 11 (Yes in step S23) before the counter value reaches the setting value (No in step S13), the failure diagnosis control circuit 10 sets the completion status (step S24). If the frame image processing completion signal is not received (No in step S23), the failure diagnosis control circuit 10 does not set the completion status.

When the counter in the failure diagnosis control circuit 10 reaches the setting value (Yes in step S13), the failure diagnosis control circuit 10 deactivates and initializes the counter (step S14). Subsequently, the failure diagnosis control circuit 10 confirms whether the completion status is set (step S15). The failure diagnosis control circuit 10, if the completion status is not set in step S15 (No in step S15), does not output the failure diagnosis processing request signal. The failure diagnosis control circuit 10, if the completion status is set (Yes in step S15), outputs the failure diagnosis processing request signal and performs the failure diagnosis processing (step S16). The failure diagnosis control circuit 10, upon terminating the processing in step S15 (branched to No) or step S16, repeats for a subsequent frame the processing in step S11 to step S15 (branched to No) or step S16.

Third Embodiment

In the third embodiment, another example of the failure diagnosis control processing characterized by performing, in series, the failure diagnosis execution control processing and the frame image processing completion status control processing will be described with reference to FIG. 10. Explanations similar to those in the second embodiment will not be repeated.

Figure 10:
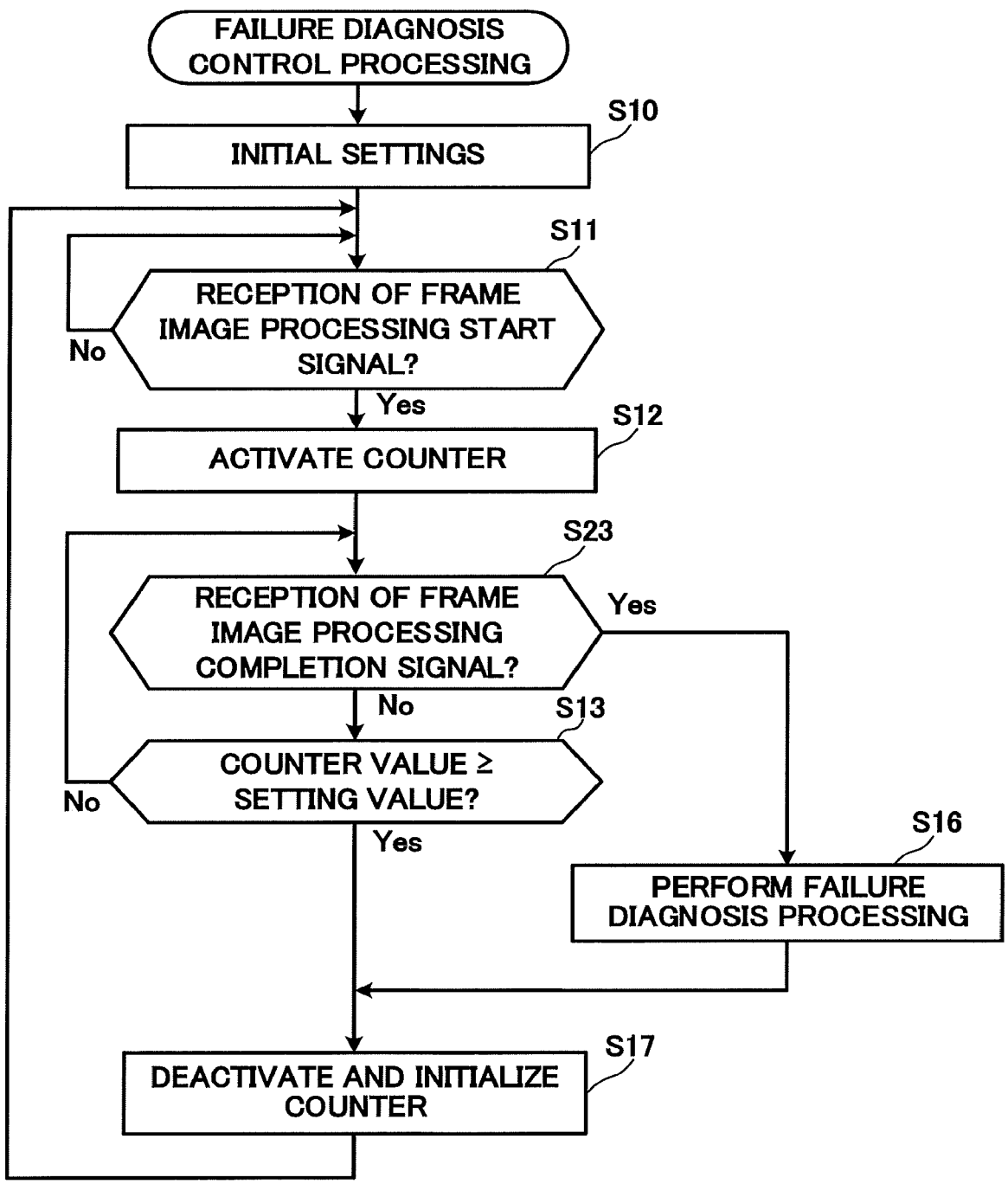
FIG. 10 is a flowchart illustrating a failure diagnosis control circuit according to a third embodiment.

In the example of the failure diagnosis control processing illustrated in FIG. 10, the failure diagnosis control circuit 10, if the frame image processing start signal is received from the image processing circuit 11 (Yes in step S11), activates the counter in the failure diagnosis control circuit 10 (step S12). The failure diagnosis control circuit 10, if the frame image processing completion signal is received from the image processing circuit 11 (Yes in step 23) before the counter reaches the setting value (No in step S13), outputs the failure diagnosis processing request signal and performs the failure diagnosis (step S16). The failure diagnosis control circuit 10, if the counter reaches the setting value or more in a state where the frame image processing completion signal is not received (Yes in step S13), does not output the failure diagnosis processing request signal.

The failure diagnosis control circuit 10, in response to the counter value reaching the setting value (Yes in step S13), or after outputting the failure diagnosis processing request signal, deactivates and initializes the counter (step S17). The failure diagnosis control circuit 10, upon terminating the processing in step S17, repeats for a subsequent frame the processing in step S11 to step S17.

In the above description, the image processing circuit 11, the failure diagnosis processing circuit 12, and the system control circuit 14 illustrated in FIG. 1 are respectively configured to include the DSP or the CPU. However, the hardware configuration is not limited to the above-mentioned examples. For example, a plurality of CPUs or a single CPU may be used to perform all of the required processing.

Further, in the above description, the failure diagnosis processing circuit 12 is configured to use the scan test pattern and the expected value to perform the failure diagnosis. However, the contents of the failure diagnosis are not limited to the examples described above. The image processing circuit 11 may be configured to execute some processing within a predetermined time and perform failure diagnosis based on the execution result.

Figure 7:
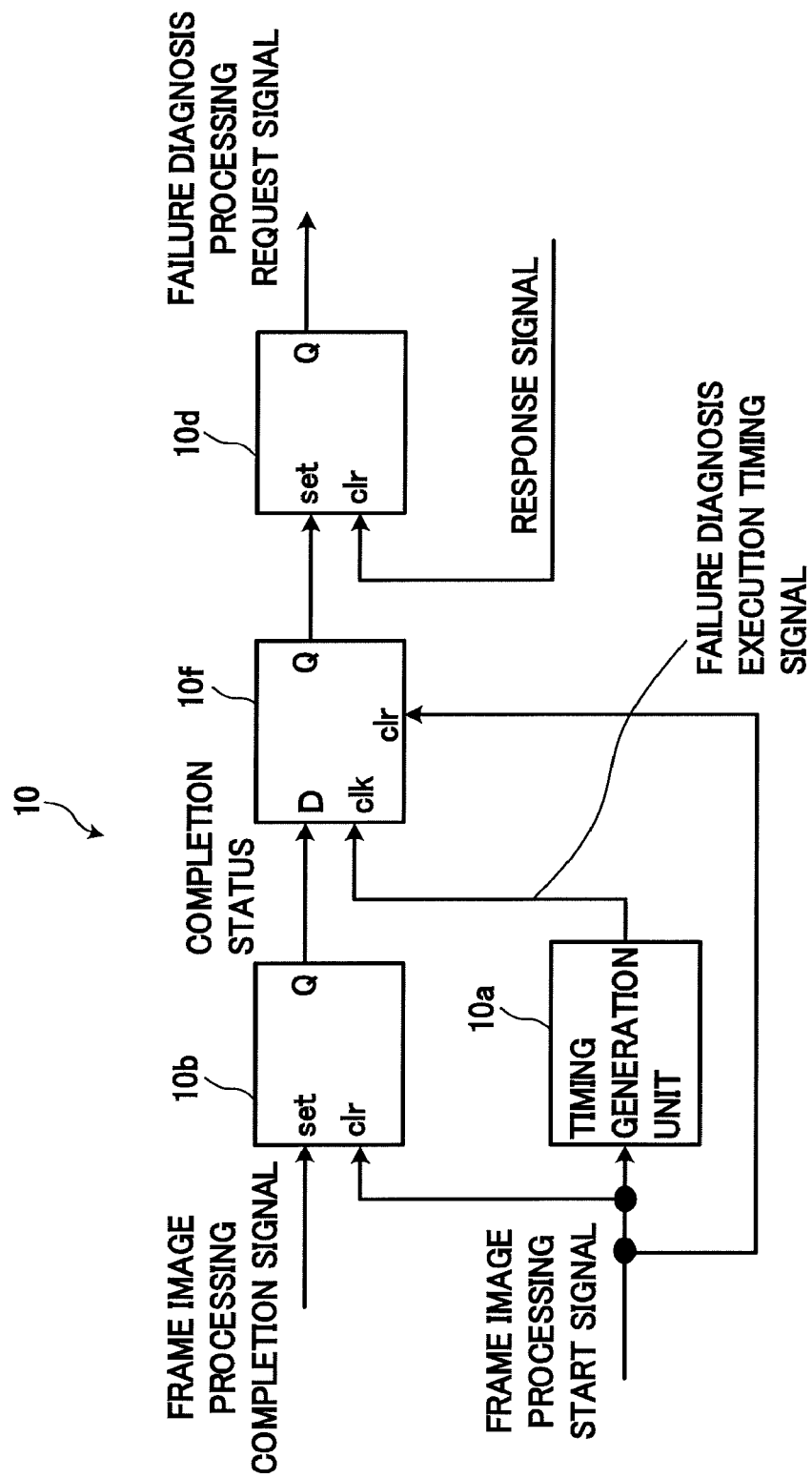
FIG. 7 illustrates an exemplary configuration of a failure diagnosis control circuit according to a modified example 1.
Figure 8:
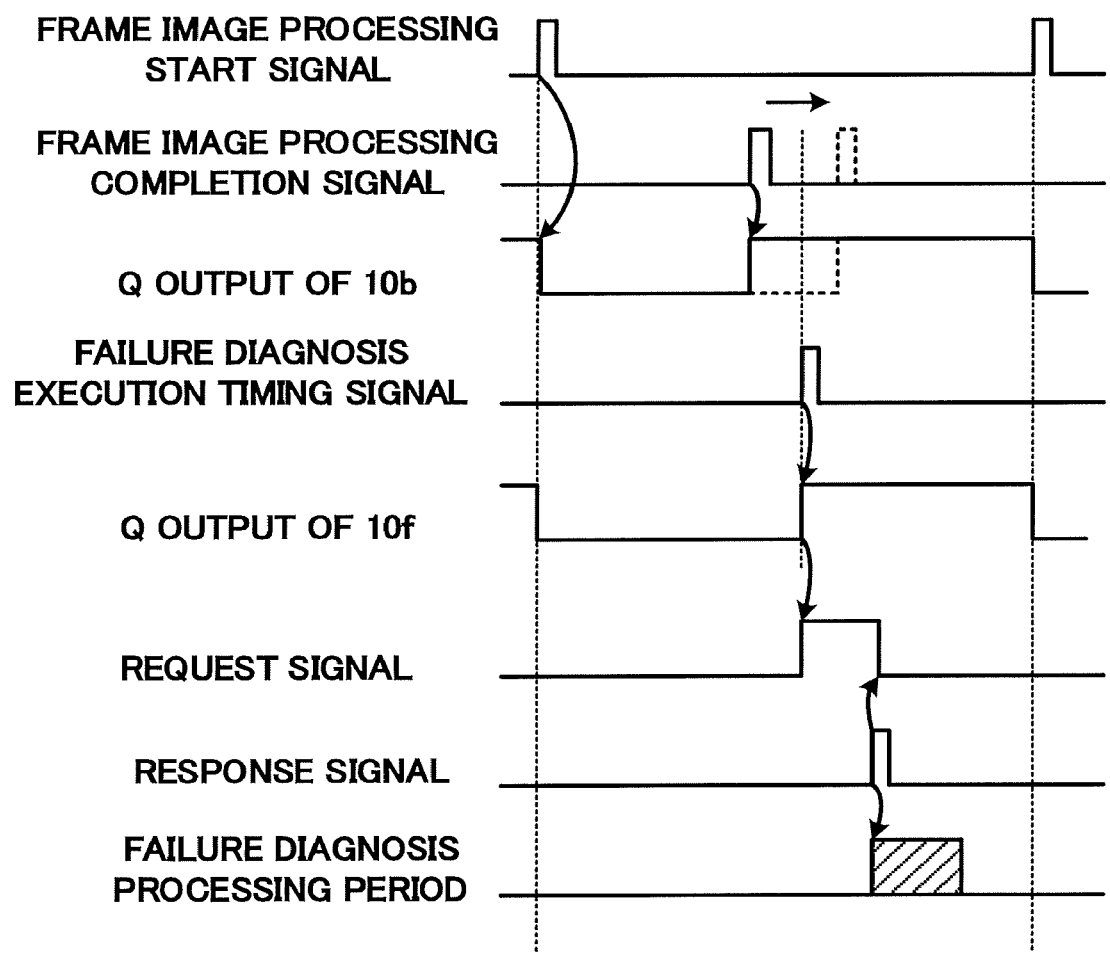
FIG. 8 illustrates the failure diagnosis control circuit according to the modified example 1.

Further, although the descriptions referring to FIGS. 2 and 7 are mainly based on the positive logic, the way of combining the logic circuits is various. For example, the above-mentioned configuration may be replaced by a negative logic circuit or a combination of positive and negative logic circuits. As a result, the AND circuit 10c illustrated in FIG. 2 may be replaced by a NAND circuit, an OR circuit, or a NOR circuit. Further, the logic circuit can be configured without using any flip-flop. The positive logic means to constitute a logic circuit by expressing true (e.g., a function exerting state) as 1 (high-level) and false as 0 (low-level).

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and sprit of the inventions.

What is claimed is:

1. A failure diagnosis control method for an image processing apparatus that performs image processing on continuously captured image data frame by frame at an image processing circuit, diagnoses a failure of the image processing circuit through a scan test in a duration in which the image processing circuit is not performing image processing for each frame, and controls whether to perform failure diagnosis for an arbitrary frame, the failure diagnosis control method comprising:
    determining whether failure diagnosis processing for the arbitrary frame can be completed before starting image processing for a subsequent frame; and
    controlling whether the failure diagnosis processing for the arbitrary frame is performed based on a determination result.

2. The failure diagnosis control method according to claim 1, wherein the determining includes,
    measuring a pre-set time triggered by receiving an image processing start information for the arbitrary frame; and
    determining whether an image processing completion information for the arbitrary frame is received before completing to measure the pre-set time.

3. The failure diagnosis control method according to claim 2, wherein, the determining includes,
    determining the failure diagnosis processing for the arbitrary frame cannot be completed before starting the image processing for the subsequent frame when the image processing completion information for the arbitrary frame is not received before completing to measure the pre-set time.

4. The failure diagnosis control method according to claim 1,
    wherein, in the controlling, when it is determined that the failure diagnosis processing for the arbitrary frame cannot be completed, the failure diagnosis processing is not performed.

5. The failure diagnosis control method according to claim 1,
    wherein determining includes,
    measuring a pre-set time triggered by receiving an image processing start information for the arbitrary frame;
    determining whether an image processing completion information for the arbitrary frame is received before completing to measure the pre-set time; and
    determining the failure diagnosis processing for the arbitrary frame cannot be completed before starting the image processing for the subsequent frame when the image processing completion information for the arbitrary frame is not received before completing to measure the pre-set time,
    and in the controlling, when it is determined that the failure diagnosis processing for the arbitrary frame cannot be completed, the failure diagnosis processing is not performed.

6. The failure diagnosis control method according to claim 1, further comprising:
    a failure diagnosis that transmits a scan test pattern and compares a scan test result of the image processing circuit with an expected value so as to diagnose a failure of the image processing circuit.

* * * * *